I. J. SCHULTENOVER.
DEVICE FOR BURNING IN BEARINGS OF AUTOMOBILES.
APPLICATION FILED FEB. 7, 1920.
1,368,060.
Patented Feb. 8, 1921.
2 SHEETS—SHEET 2.
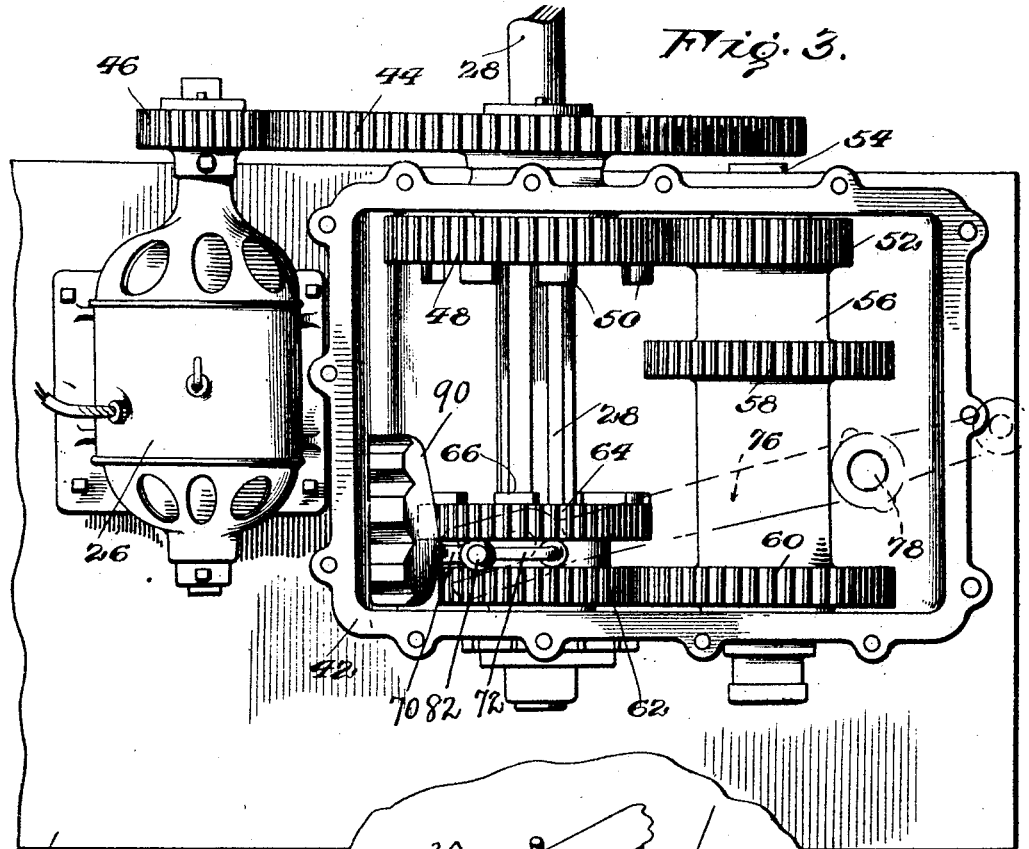
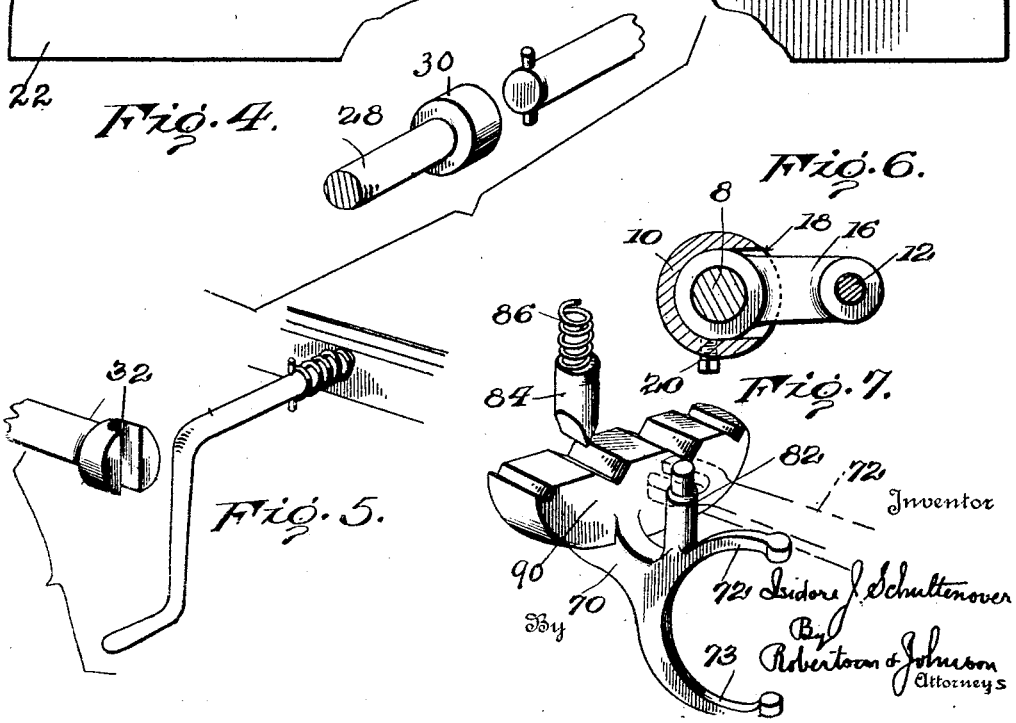

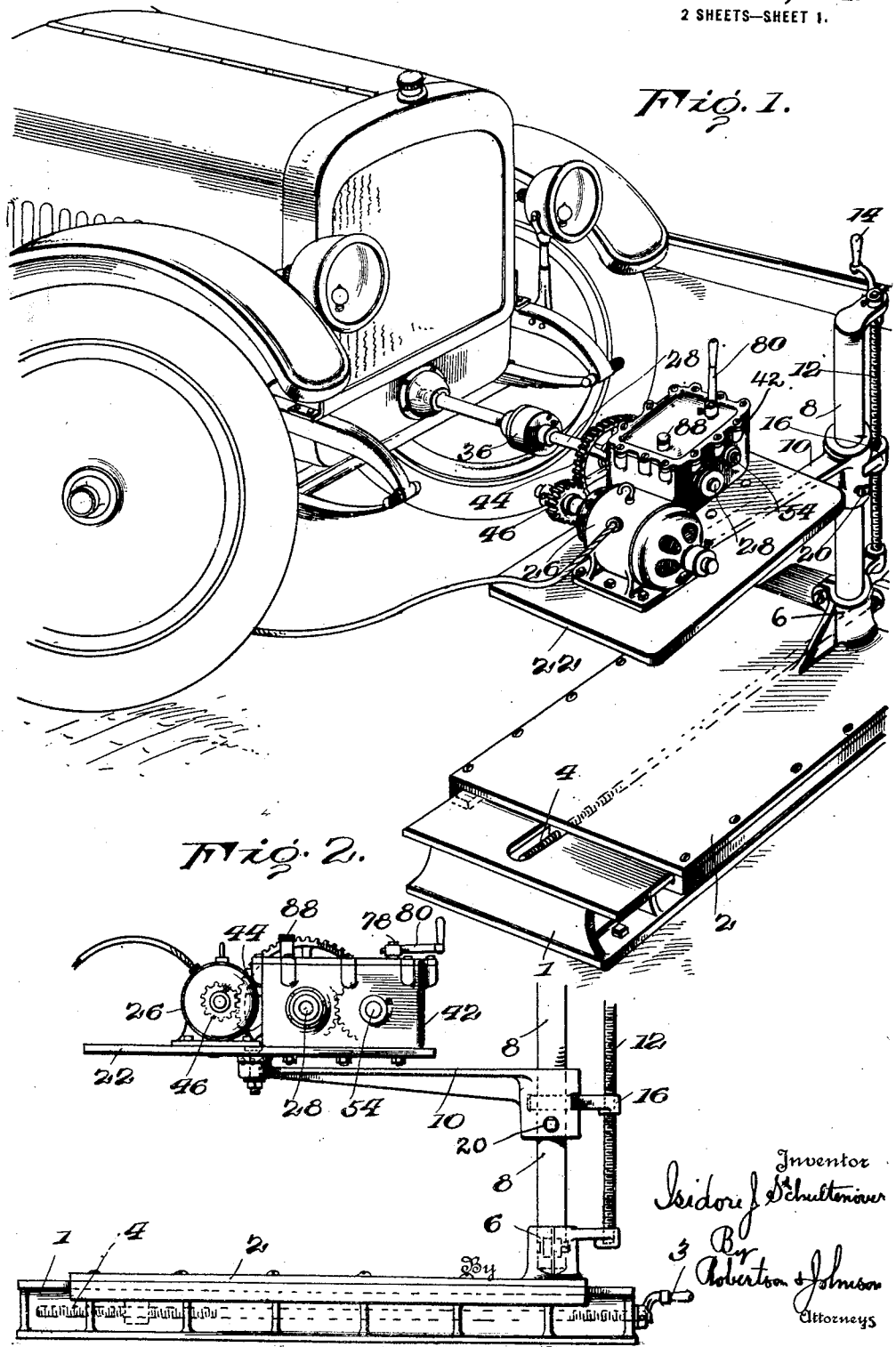

UNITED STATES PATENT OFFICE.

ISIDORE J. SCHULTENOVER, OF MELROSE, MINNESOTA, ASSIGNOR OF ONE-FOURTH TO ALPHONS H. KRAKER AND ONE-FOURTH TO EDMUND J. McGOWAN, BOTH OF MELROSE, MINNESOTA.

DEVICE FOR BURNING IN BEARINGS OF AUTOMOBILES.

1,368,060.   Specification of Letters Patent.   Patented Feb. 8, 1921.

Application filed February 7, 1920. Serial No. 357,105.

*To all whom it may concern:*

Be it known that I, ISIDORE J. SCHULTENOVER, a citizen of the United States of America, and a resident of Melrose, in the county of Stearns and State of Minnesota, have invented certain new and useful Improvements in Devices for Burning In Bearings of Automobiles, of which the following is a specification.

This invention relates to a device for use in what is commonly known in a garage as "burning in" or wearing in the bearings of an automobile while the engine is still in the car. It is well known that when the Babbitt bearings of an automobile burn out or are so badly in need of adjustment that new bearings have to be fitted in in place of the burned or worn ones, it is necessary to "burn in" or wear in the bearings until all the babbitts are in perfect alinement, etc., and this process as now carried out is exceedingly tedious and sometimes ineffective, the process usually taking three or four hours after the new bearings are all in place. In this aperation of "burning in" or wearing in, the mechanic does not dare at first to run the motor under its own power, as the heat generated by the new bearings, plus that of the running of the engine under its own power, is so great that the babbitts would almost certainly be burnt out before the work of wearing in was half accomplished. Hence it is often the practice to haul or tow the car around the streets for a while until part of the roughness or untrueness has been worn down, when the motor is run under its own power in the garage for several hours. Even then the mechanic is compelled to keep a constant stream of water running through the radiator, as from a hose, to prevent overheating and the burning out of the new babbitts. It is the object of my invention to provide a device which will drive the motor of the car, while still in the car, from an extraneous source of power so that no heat whatever is generated from the running of the engine, except such as comes from friction generated by the new babbitts. And in the preferable embodiment of my invention, I employ a device with speed changing means whereby the engine with its new babbitts may be run very slowly at first and then, after the babbitts have been worn partially down and the friction thereby lessened, the speed may be changed, and finally for the last period the fastest speed may be used, until the bearings are worn down to the point where it will be safe to run the motor by its own power.

The invention therefore consists, in its preferable embodiment, in the device for burning in or wearing in bearings of automobiles, as hereinafter described and then definitely claimed.

In the drawings accompanying and forming part hereof:

Figure 1 is a perspective view of one of the embodiments of my invention, connected to an automobile, ready for operation.

Fig. 2 is an elevation of the same.

Fig. 3 is a view of the preferable arrangement for changing the speed.

Fig. 4 is a perspective detail of the device for connecting to the engine shaft.

Fig. 5 is a perspective view of an alternative connection for use on a "Ford."

Fig. 6 is a sectional detail of the clamp for connecting the turn table or platform to the standard.

Fig. 7 is a perspective view of the gear shifting lever and connected parts.

Referring now to the details of the drawings by numerals: 1 designates a base which is preferably bolted to the floor of the garage in some convenient position, and upon this base is slidably supported the table 2, so that it may be adjusted back and forth on the platform by means of a crank 3 used to operate a threaded shaft 4. The table 2 carries a socket 6 in which is supported a standard or pillar 8. Said pillar 8 has an arm or bracket 10 projecting therefrom, the bracket being slidable up and down on the standard or pillar and also rotatable thereon for a purpose to be hereinafter described. In order that the bracket 10 may be adjusted vertically, I employ a threaded shaft 12 operated by a crank 14 at the upper end thereof, said threaded shaft passing through a link 16 which enters an opening 18 in that part of the arm or bracket 10 which encircles or embraces the standard or pillar 8, a set screw 20 being employed to hold the arm or bracket 10 from swinging on the pillar 8, when it has once been adjusted to its proper position.

Upon the free end of the bracket 10 is swiveled a platform or turn-table 22 which, in the preferable embodiment of my invention, supports an electric motor as 26, a shaft 28 run thereby and a gear shift for connecting said motor to said shaft. Said shaft is adapted to be connected to the main shaft of the engine of the automobile, and to that end the end of the shaft may have alternative sockets as 30 shown in Fig. 4 to connect onto the shaft of an automobile having a self-starter, or with a socket as 32 for connecting to the crank of a "Ford" as shown in Fig. 5.

In the preferable embodiment of my invention, I provide a gear shift between the electric motor 26 and the shaft 28, one form of which is shown in Fig. 3. As there shown there is a casing 42 properly bolted on the platform or turn-table 22. Within this casing is properly journaled the shaft 28 above referred to, and loosely supported on said shaft is a large gear 44 meshing with a small gear 46 supported on and driven by the shaft of the electric motor 26. To this shaft, within the casing 42, is fixed a gear 48 having clutch elements 50 thereon. This gear 48 is constantly in mesh with a gear 52 on a second shaft 54, said gear 52 being part of a drum or sleeve 56 upon which are the gears 58 and 60. Slidably supported on the shaft 28 so as to always rotate therewith are two gears 62 and 64, the first one being smaller than the other, and the latter having clutch elements 66 adapted to engage the clutch elements 50 on the aforesaid gear 48. The gears 62 and 64 are slidable on the shaft 28, so that the small gear 62 may mesh with the gear 60, or it may be moved out of mesh therewith into a neutral position, or the gears 62 and 64 may be moved over until the larger gear 64 meshes with its gear 58, or the gears 62 and 64 may be moved over farther still until they are both out of gear and until the clutch elements 66 engage the clutch elements 50, in which event the shaft 28 will be directly connected through the clutch elements with the gear 48 and as the latter is fast on the large gear 44 it follows that the shaft 28 will be directly connected with the gear 44. Thus it will be seen that when the gears 60 and 62 are in mesh the shaft 28 is driven at a very slow speed, but when the gears 64 and 58 are in mesh, the device will be in "second" so to speak, and that when the clutch elements mesh, the shaft 28 will be directly connected and run at high speed.

In order that these gears may be shifted as desired, I employ a shifting lever 70, shown best in Fig. 7, which is provided with a yoke, the arms 72 and 73 of which fit between the gears 62 and 64. To operate this shifting lever, I provide a lever 76 which is pivoted at 78 to the cover of the casing 42, the pivot 78 being provided on the exterior of said casing with a crank handle 80 by which the lever 76 may be thrown. The opposite end of lever 76 engages a stud 82 on the shifting lever 70. It will therefore be readily seen that whenever the crank handle 80 is moved, the lever 76 will be moved to one side or the other, to move the shifting lever 70, and thereby shift the gears. In order to hold the gears in the position to which they have been shifted, the lever 70 is provided with an arm 90 having four depressions, into any one of which may fit the spring actuated detent 84 shown in Fig. 7, this detent and its spring 86 being contained in a cup 88 on the cover of the casing 42 (see Fig. 1).

The operation of my device is as follows: The device is preferably bolted to the floor of the garage at some suitable point, and the car, either before or after having the new babbitts placed in its bearings (there are usually seven or more) is moved up as near to the device as the operator thinks proper. Then the cranks 3 and 14 may be operated and the turn-table may be moved either on its arm 10, or on the standard 8, or on both, until the shaft 28 is in exactly the proper position to be secured to the crank shaft of the automobile. In "burning in" bearings, it is now sometimes necessary for the mechanic to get under the car, and have his helper turn over the crank, with great labor, to shift the position of the crank shaft to the convenience of the mechanic, and this has to be done a number of times. With my apparatus, the helper may be dispensed with, since the mechanic takes the wires from the motor under the car with him, and he may press the switch (not shown) just long enough to turn the crank to the desired point, and then stop it. After thus refitting and inspecting each of the bearings, he can start the motor with the crank handle 80 thrown into "low" gear, and after the device has turned over the engine for an hour or so, or when in his judgment he considers the first stage of "burning in" to have been completed, he moves the crank 80 so as to throw the gears into "second," and after running in this gear an hour or so, he finally throws the crank 80 into "high," and leaves it there until his experience tells him that the bearings have been completely "burned in" or worn down to absolutely smooth running order, at which time it will be safe for the car to be run under its own power.

From the foregoing and the accompanying drawings, it will be seen that I have invented a device for turning the crank shaft of an automobile engine while the engine is still in the car, that will enable one operator to safely "burn in" the bearings of an automobile with absolutely no danger to the new bearings and that the work will be accomplished mechanically, with the least possible attention, thus allowing the mechanic to be engaged in other work, giving only the slightest casual attention to the motor being "burned in".

It will be obvious that changes and modifications may be made in the form and construction of my invention without departing from the spirit of the invention, the scope of which is set forth by the appended claims.

What I claim as my invention is:

1. In a device of the character described, a suitable support, means for adjusting said support with respect to the engine to be operated upon, and a motor supported thereon for driving the shaft of the engine to be "burned in".

2. In a device of the character described, a suitable support, means for adjusting said support with respect to the engine to be operated upon, a motor supported thereon for driving the shaft of the engine to be "burned in", and speed changing means whereby said motor may operate said shaft at slow speed and then at a faster speed.

3. In a device of the character described, a suitable support, and a motor on said support for driving the shaft of the engine to be "burned in", said support being swiveled and also adjustable both vertically and horizontally.

4. In a device of the character described, a suitable support, a motor thereon for driving the shaft of the engine to be "burned in", and speed changing means whereby said motor may operate said shaft at slow speed and then at a higher speed, said support being swiveled and also adjustable both vertically and horizontally.

5. In a device of the character described, a suitable support, a motor thereon, transmission driven by said motor, the shaft of the transmission being adapted to drive the shaft of the engine to be "burned in," said support being adjustable whereby the transmission shaft may be alined with that of the automobile.

6. In a device of the character described, a suitable support, a motor thereon having a small gear on its shaft, transmission also supported on said support and operatively connected by a large gear with the small gear on the motor, the shaft of the transmission being adapted to drive the shaft of the engine to be "burned in".

7. In a device of the character described, a suitable support, a motor thereon, transmission driven by said motor, the shaft of the transmission being adapted to drive the shaft of the engine to be "burned in," and a handle for changing the gearing in said transmission whereby the automobile shaft may be driven at different speeds.

8. In a device of the character described, a suitable support, a motor thereon, transmission driven by said motor, the shaft of the transmission being adapted to drive the shaft of the engine to be "burned in," and a handle for changing the gearing in said transmission whereby the automobile shaft may be driven at different speeds, said motor and transmission support being adjustable whereby the transmission shaft may be alined with the shaft of the automobile.

9. In a device of the character described, a table, a pillar supported thereby, an arm or bracket movable vertically on said pillar, a turntable supported by said arm, a motor on said turn-table, transmission also supported by said turn-table and driven by said motor, the shaft of the transmission being adapted to be coupled to the crank shaft of an automobile.

10. In a device of the character described, a bed, a table longitudinally adjustable on said bed, a pillar supported by said table, an arm, means for adjusting said arm or bracket up and down on said pillar, a turntable supported by said arm or bracket, a motor on said turn-table, transmission also supported by said turn-table and driven by said motor, and the shaft of the transmission being adapted to be coupled to the crank shaft of an automobile.

11. In a device of the character described, a bed, a table longitudinally adjustable on said bed, a pillar supported by said table, an arm, means for adjusting said arm or bracket up and down on said pillar, a turntable supported by said arm or bracket, a motor on said turn-table, transmission also supported by said turn-table and driven by said motor, the shaft of the transmission being adapted to be coupled to the crank shaft of an automobile, and a handle for changing the gearing in said transmission whereby the automobile shaft may be driven at different speeds.

12. In a device of the character described, a suitable support, a motor thereon, transmission driven by said motor comprising a shaft adapted to be connected to the shaft of the automobile to be "burned in," three sets of gearing in said transmission, and a handle for shifting the gears whereby the automobile shaft may be driven at different speeds.

In testimony whereof I affix my signature.

ISIDORE J. SCHULTENOVER.